June 18, 1940. H. L. RUSCH 2,204,774
MOTOR
Filed Sept. 5, 1936 5 Sheets-Sheet 1

INVENTOR
HUGO L. RUSCH.
BY
ATTORNEY

June 18, 1940.　　　H. L. RUSCH　　　2,204,774
MOTOR
Filed Sept. 5, 1936　　　5 Sheets-Sheet 2

INVENTOR
HUGO L. RUSCH
BY
ATTORNEY

June 18, 1940.  H. L. RUSCH  2,204,774
MOTOR
Filed Sept. 5, 1936   5 Sheets-Sheet 3
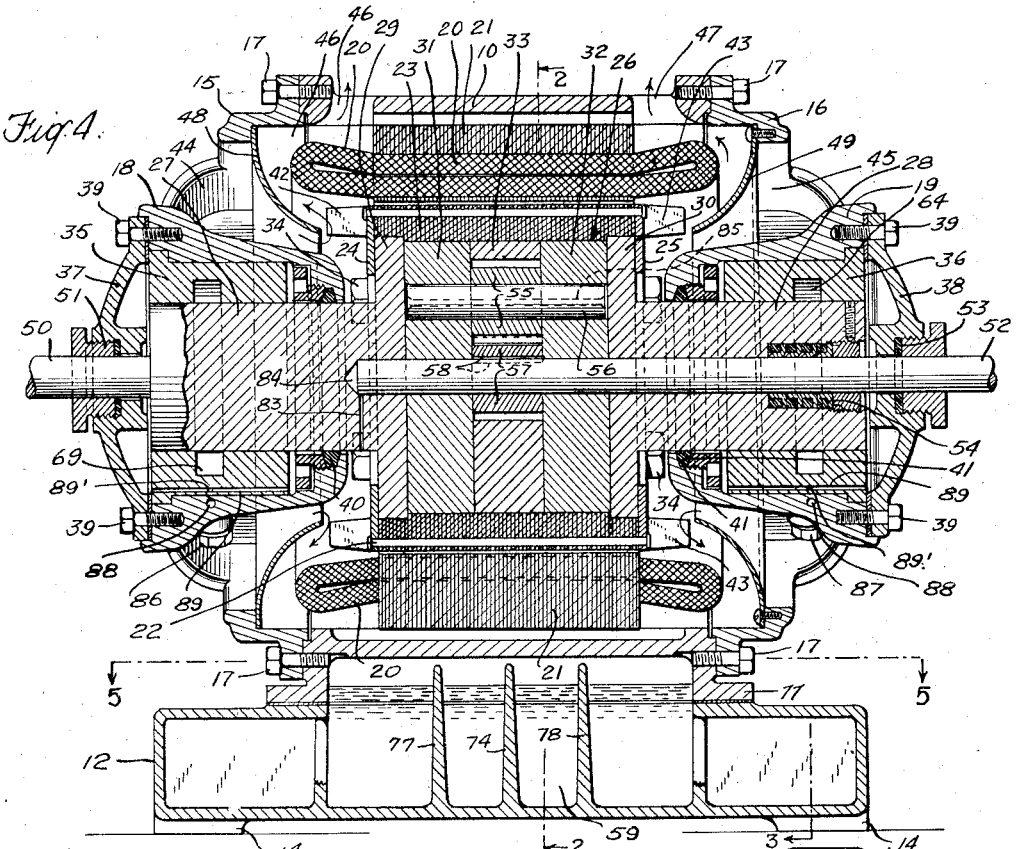
Fig. 4.
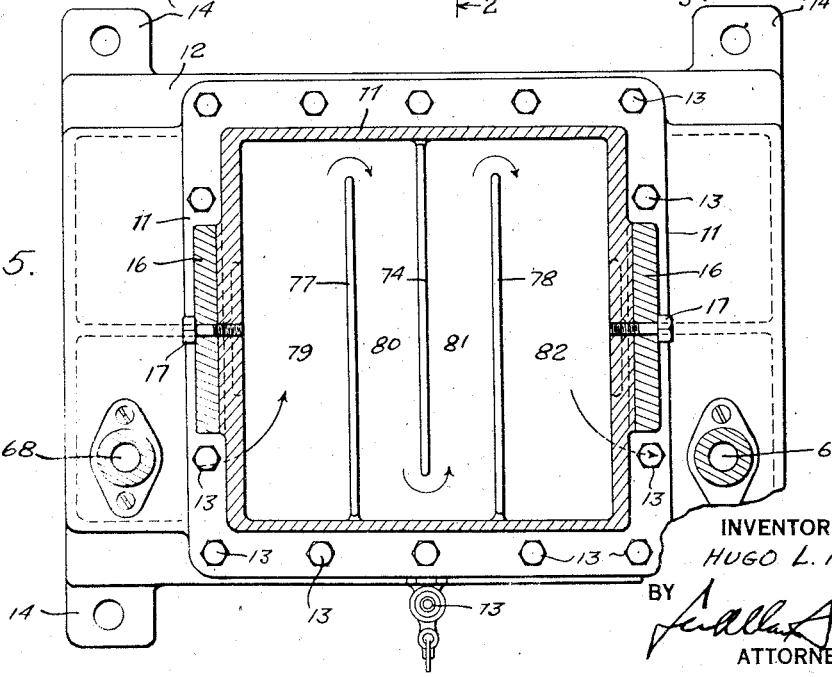
Fig. 5.
INVENTOR
HUGO L. RUSCH.
BY 
ATTORNEY

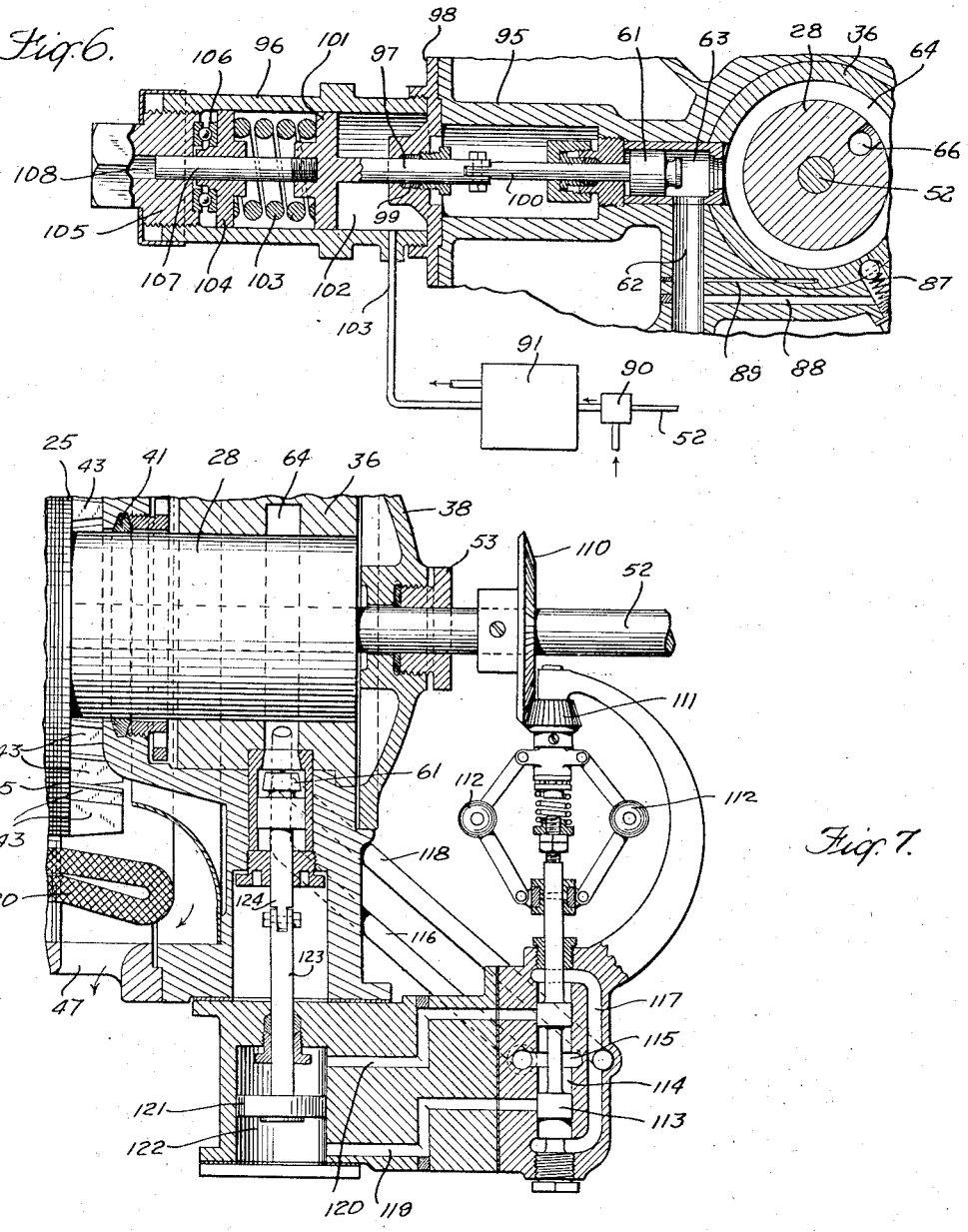

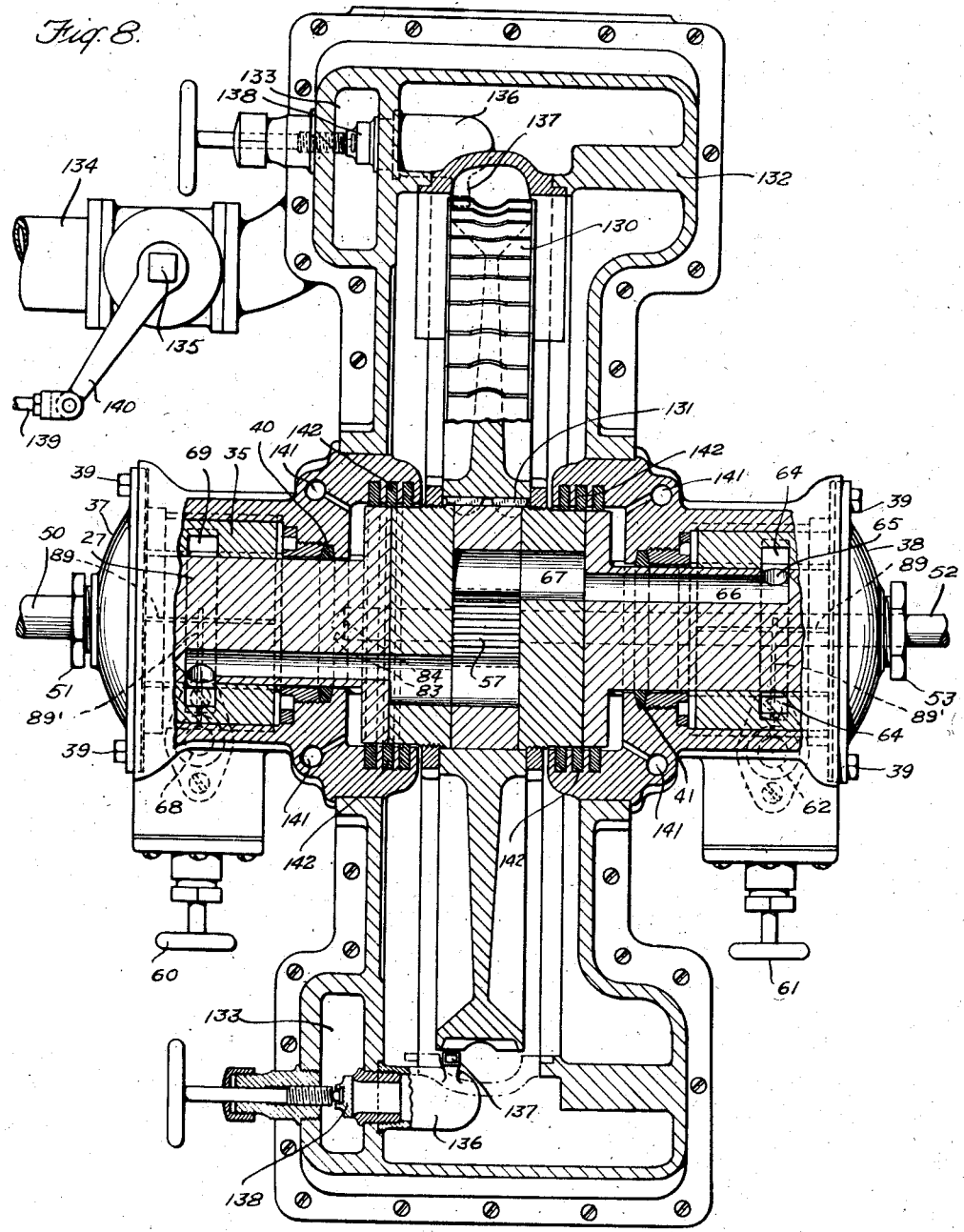

Patented June 18, 1940

2,204,774

UNITED STATES PATENT OFFICE 2,204,774

MOTOR

Hugo L. Rusch, Crestwood, N. Y.

Application September 5, 1936, Serial No. 99,507

19 Claims. (Cl. 172—239)

This invention relates to motors in general, and is applicable to all types of prime movers, but it is especially adaptable to electric motors.

In the art of electric motors, early units were of the direct current type and speed variations of the output or driving shaft were possible within restricted limits by the insertion of certain resistances in the field and armature circuits. Later, with the advent of the more practical alternating current motors, which are so extensively used in industry today, the problem of speed control and speed variation became more acute due to the inherent operating principles of these alternating current motors. Furthermore, the alternating current motor of simplest construction and in extensive use today is of the squirrel cage induction type, but this lends itself least effectively to speed variation and control of all the alternating current types; only by altering the number of poles in the primary winding is it possible to obtain any speed variations or control at all with the squirrel cage induction motor.

The present invention overcomes these great limitations in speed control and speed variations of all types of electric motors and provides an electric motor which may be of any type—direct current, or the various basic alternating current motors, such as the squirrel cage induction motor, wound rotor induction motor, repulsion induction, split-phase induction, capacitor, or synchronous motors—in which the rotation of an armature is effected by conventional electro-magnetic principles, but, at the same time, the invention provides infinite variations in the speed of the motor output shaft from zero to maximum speed of the armature. In the conventional electric motors the output shaft is fixed to the armature and rotates at the same speed as the armature, but in the present invention the armature and output shaft can rotate independently of each other. The motor of the present invention also functions as a clutch betwen the armature and the power output shaft.

The invention is applicable to all types and styles of electric motors as well as other motors such as air motors and turbines. However, it is particularly applicable to and valuable for alternating current motors of the squirrel cage-induction, repulsion-induction and split-phase types, which are the most economical and most extensively used of all motors today, but with these types it has been particularly difficult to obtain speed control and speed variation. The invention is also applicable, as heretofore and as will be hereinafter further indicated, to types of motors, other than electric, and is also applicable to other types of prime movers.

The invention will be understood from the following description considered in connection with the accompanying drawings forming a part thereof, and in which:

Fig. 4 is a vertical longitudinal sectional view, taken substantially on line 4—4 of Fig. 1;

Fig. 5 is a horizontal sectional view taken on line 5—5 of Fig. 4;

Fig. 6 is a sectional view of an automatic pressure control mechanism applicable to the motor of the present invention;

Fig. 7 is a sectional view of an automatic speed control mechanism applicable to the present invention; and Fig. 8 is a view similar to Fig. 1, but showing the invention applied to a steam turbine.

Like characters of reference designate the same or similar parts throughout the several views.

Figure 1:
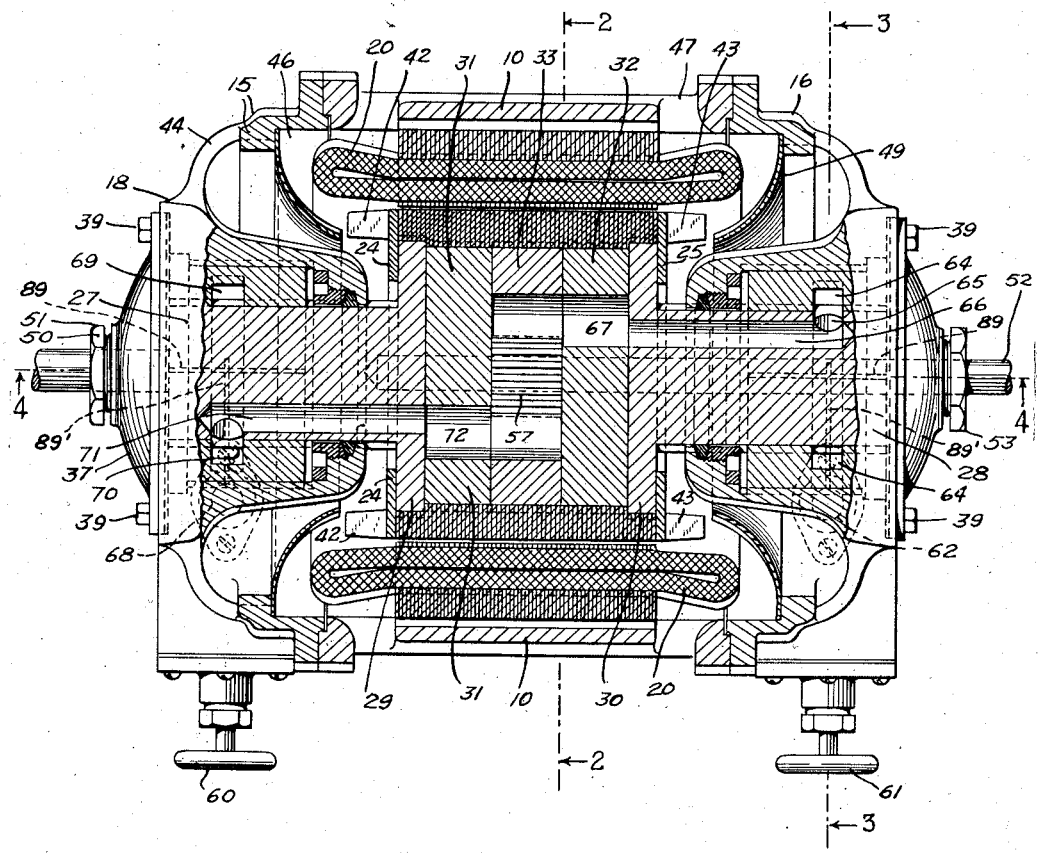
Fig. 1 is a horizontal, longitudinal sectional view taken substantially on line 1—1 of Fig. 3, illustrating an electro-hydraulic variable speed motor of the squirrel cage induction, alternating current type, embodying the invention.

Referring to Figs. 1 to 5 of the drawings, reference character 10 designates the housing for the electro-hydraulic motor unit selected for the illustration of an embodiment of the invention. The housing has a main section which is cylindrical in form and an integral supporting section 11 arranged to rest upon and to be secured to a base section 12 by bolts 13 or the like. The base section 12 is provided with supporting feet 14 at the four corners thereof, which are arranged to support the base section in spaced relationship to the member or part to which the motor may be secured, although these feet may be arranged to support the motor with the bottom of the base section in contact with the member or part to which it is secured. The ends of the main cylindrical section of the housing 10 have end plates 15 and 16 secured to the housing by bolts 17 or the like, and these plates have bearing supporting rings 18 and 19 respectively, integral with the plates.

As shown, the electro-hydraulic motor unit includes primary (or stator) and secondary (or rotor) windings, a rotor, a fluid pump carried by the rotor, a driven or output shaft, and control valves for regulating the fluid flow and pressure of the operating fluid.

The primary (or stator) winding 20 is laid in a magnetic core 21 consisting of annular laminations clamped together and secured in the main section of the housing 10. The secondary or rotor winding comprises a plurality of rods 22, preferably copper, laid in a magnetic core 23 consisting of annular laminations clamped together and mounted on the outer peripheral portion of the rotor. Copper rods 22 are connected together mechanically and electrically by rings 24 and 25 secured to the ends of the rotor and through which the copper rods extend, thereby completing the squirrel cage rotor winding.

The rotor or rotating element 26 comprises rotor hubs 27 and 28, oppositely disposed with respect to each other and provided with annular flanges 29 and 30 respectively, pump side plates 31 and 32 and a pump cylinder 33. The pump cylinder 33 is disposed as shown between the pump side plates 31 and 32, and these members 31, 32 and 33 are disposed between the rotor hubs 27 and 28. The hubs, side plates and pump cylinder are secured together by a plurality of bolts 34 which extend through the peripheral portions of the members 31, 32 and 33 and through the flanges 29 and 30 of the hub members.

The rotor 26 is rotatably supported in the housing of the unit in rotor bearing members 35 and 36 which are disposed in the bearing supporting rings 18 and 19 respectively. Rotor hubs 27 and 28 of rotor 26 have a close running fit in rotor bearing members 35 and 36. The outer ends of the rings 18 and 19 are closed by end plates 37 and 38 respectively, secured in place by bolts 39. Bearing members 35 and 36 are retained in position against movement by a laterally extending flange on the outer end of each, which is received in a recess in the supporting rings 18 and 19 and bears against the gasket between said rings and the cooperating end plates 37 and 38. The inner ends of the supporting rings 18 and 19 have packing glands 40 and 41 respectively, to prevent leakage of fluid from the rotor hubs into the space where the fluid would come into contact with the motor windings. Rings 24 and 25 of the rotor are provided with blades 42 and 43 respectively, which serve as fans to cause the circulation of air through the housing of the unit and thereby cool the windings of the electric motor in the conventional manner. Housing end plates 15 and 16 are provided with a plurality of air inlet ports 44 and 45 respectively, and the main section of the housing 10 is provided with a plurality of air outlet ports 46 and 47 respectively. Air directing plates 48 and 49 are secured to end plates 15 and 16 respectively, and serve to direct air that is drawn into the inlet ports 44 and 45 as a result of the fan action of blades 42 and 43, and also to direct air as it leaves these blades toward the outlet ports 46 and 47. A shaft 50 integral with hub 27 passes through a seal 51 in end plate 37; this is an auxiliary shaft that is fixed to the rotor, rotating at armature speed, and may be employed if desired in the conventional manner. The variable speed output shaft 52 extends from outside the housing 10 through a seal in plate 38, then through a packing gland 54 in the rotor hub 28 and through the hub, through the pump side plates 31 and 32, then through the pump cylinder 33 and into the hub 27 for a short distance as shown. Shaft 52 has bearings in plates 31 and 32 and has a running fit in all of the members through which it passes, with the exception of the pump cylinder 33.

In the form of the invention selected for illustration, the fluid pump or the means for producing fluid flow and pressure is a rotary gear pump which is disposed in the rotor and is driven by the electric motor; it is arranged to receive and discharge fluid through passages disposed in the rotor. Various types of pumps may be employed. The pump shown comprises a driving impeller 55 which is disposed within the confines of the pump cylinder 33 and is keyed with key 58' on an impeller shaft 56, which bears in the pump side plates 31 and 32, and an impeller 57 disposed within the pump cylinder 33 and keyed to the output shaft 52 by a key 58.

Figure 3:
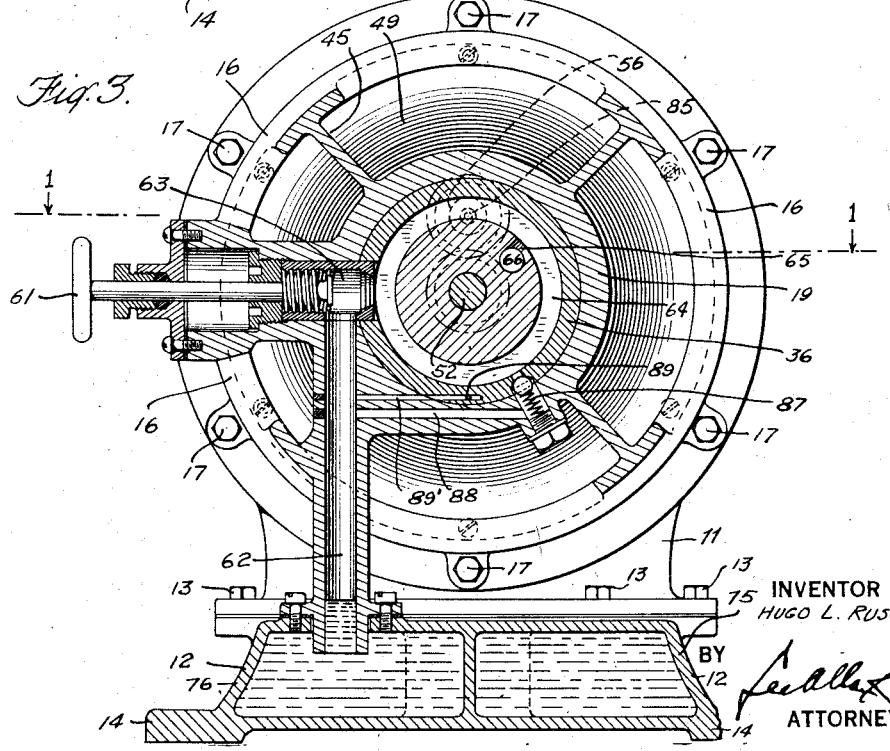
Fig. 3 is a transverse, vertical sectional view, taken substantially on line 3—3 of Fig. 1.

The operating fluid for the pump, such as a suitable oil, glycerine or other suitable fluid, is collected in a reservoir 59 in the base section 12 of the housing 10 and is normally maintained at the level indicated in Fig. 4 of the drawings. The unit is arranged to permit flow of fluid from the reservoir 59 to the pump and back to the reservoir in such manner that the direction of rotation of the pump, the rotor, and variable speed output shaft 52 may be reversed without requiring any adjustments. The desired speed variations and speed control are obtained by regulating the flow and pressure of the fluid with control valves 60 and 61. The fluid passages for conducting operating fluid from the reservoir to and from the pump, in the form shown, pass through the rotor bearing members 35 and 36 and through the rotor itself. Referring to Fig. 3, a vertically extending fluid passage 62 passes through end plate 16 and the bearing supporting ring 19 with its lower end disposed below the normal liquid level in the reservoir 59 and with its upper end connecting with a control valve 61 extending radially inwardly of the housing 10 and the end plate 16. The control valve 61 may be of any form suitable for the purpose intended. Fluid passage 63 in valve 61 connects with an annular fluid passage 64 disposed in the bearing member 36. Passage 64 registers with a radially extending passage 65 in rotor hub 27 which in turn connects with a passage 66 in hub 28 which extends longitudinally of the hub, parallel to, but spaced from, the axis thereof. The inner end of passage 66 connects with a passage 67 in pump side plate 32 which is of larger flow area than the passage 66. Passage 67 connects at its inner end with the fluid pump. A similar system of connected fluid passages is arranged to conduct operating fluid between the pump and the end of reservoir 59 opposite the end with which fluid passage 62 connects. This similar system includes a vertically extending fluid passage 68 having its lower end disposed below the normal fluid level in reservoir 59 and its upper end connecting with a control valve 60, similar to valve 61. The fluid passage in valve 60 connects with an annular passage 69 disposed in bearing member 35, and registering with passage 69 is a radially extending short passage 70 in hub 27 of the rotor which connects at its inner end with a longitudinally extending passage 71 in this hub member, the inner end of which connects with a passage 72 of larger flow area than passage 71, disposed in pump side plate 31. The passage 72 connects with the fluid pump. Passages 65, 66 and 67 are oppositely disposed in the rotor 26 with respect to the passages 70, 71 and 72.

A sight gage 73 disposed at one side of the housing is connected through suitable connections with the reservoir 59 and the interior of the housing 10 to provide visual means for determining the quantity of operating fluid in the reservoir 59.

The base section 12 of the housing 10 is arranged and constructed so as to provide a tortuous or circuitous path of flow of the operating fluid through the reservoir during operation of the motor in its flow through the reservoir between the fluid passages 62 and 68. In the form shown, the base section 12 is provided with a plurality of webs or partitioning members which direct the flow of operating fluid in its passage through the reservoir. As shown, these webs or partitioning members extend upwardly from the bottom wall of the base section 12 and connect with one of the side walls of the base section. A centrally disposed web 74 extends at right angles from the side wall 75 toward the opposite side wall 76 but terminates somewhat short thereof. Webs 77 and 78 disposed on opposite sides of web 74 extend normally from side wall 76 toward wall 75 but both of these webs terminate short of wall 75. With this arrangement, it will be perceived that operating fluid discharged from vertically extending fluid passage 68, for instance, will flow into compartment 79 of the reservoir, into and successively through compartments 80, 81, and 82 before it reaches the vertically extending fluid passage 62. Should the direction of rotation of the rotor and the pump be reversed, the operating fluid will be delivered to the reservoir through passage 62 and will flow through the beforementioned compartments of the reservoir in reverse order.

A small passage 83, Fig. 4, is drilled into hub 27 from the periphery thereof to the cavity 84 in hub 27 at the end of output shaft 52. This passage prevents any liquid which may travel along shaft 52 from the pump into the cavity from building up a high pressure therein. Any such pressure would tend to force the shaft out of the housing, and would also tend to force impeller 57, which is keyed to the output shaft, against side plate 32. By providing passage 83, the output shaft and the impeller 57 are balanced in an axial direction and will not be unbalanced by hydraulic pressure. Any liquid coming from passage 83 would be drained to the base section 12 and reservoir 59.

Impeller shaft 56, Fig. 4, has a small hole 85 drilled axially therethrough to prevent hydraulic pressure at either end of this shaft from forcing it against either of the flanges 29 or 30, and also prevents hydraulic pressure on either end of shaft 56 from forcing the impeller thereon against either of the side plates 31 or 32.

Momentary or continuous overloading of the motor is prevented by providing spring-loaded ball-type relief valves 86 and 87, Figs. 3 and 4, in bearing supporting rings and bearing members 18, 35 and 19, 36 respectively, which are connected from annular passages 69 and 64 respectively, by short passages. A passage 88, Fig. 3, extending horizontally through bearing supporting ring 19 conducts liquid from valve 87 to passage 62. A similar passage (not shown) conducts liquid from valve 86 to passage 68, through which it flows into the reservoir 59. Whenever the load on the device develops a pressure in either annular passage beyond the setting of the corresponding relief valve, this valve will open, and the speed of the output shaft will drop until the load thereon no longer results in an excess pressure in the passages on the discharge side of the pump. Whenever either of the annular passages 69 or 64 is on the suction side of the pump, the spring in the relief valve will keep the valve closed and will prevent the drawing in of air.

A leakage drain consisting of a passage 89 which extends through bearing member 36, and a connecting passage 89' which extends through both bearing member 36 and supporting ring 19, conducts leakage fluid from ahead of packing gland 41, and also from the recess provided in end plate 38 between bearing member 36 and the end plate, to the passage 62. A similar leakage drain is similarly disposed at the opposite end of the unit in bearing member 35 and supporting ring 18, and conducts any leakage from ahead of packing gland 40 and from the recess in end plate 37, to passage 68.

Figure 2:
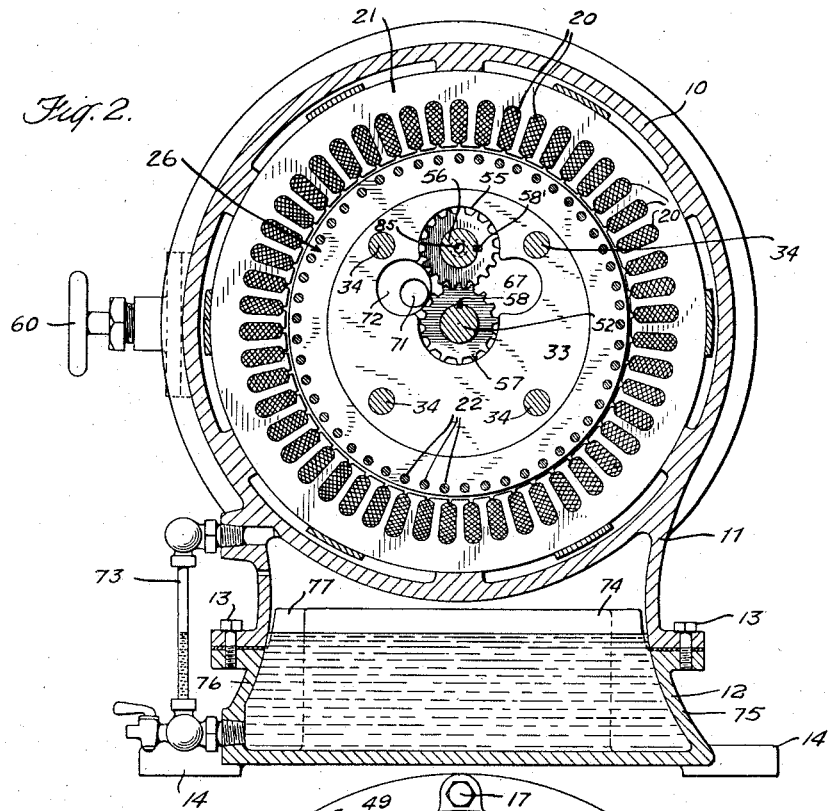
Fig. 2 is a transverse, vertical sectional view, taken substantially on line 2—2 of Fig. 1.

In operation, with electric current being supplied to the motor, and assuming that the rotor is rotating in a clockwise direction, as seen in Fig. 2, and that both control valves 60 and 61 are in the fully open position, the fluid pump will be operating with impeller 55 revolving as well as rotating in a clockwise direction, as seen in Fig. 2, while impeller 57 remains stationary as does also output shaft 52. In these circumstances, operating fluid is withdrawn from reservoir 59 in the base section 12 of housing 10 and is drawn by the pump through passage 68, valve 60, passages 70, 71 and 72 into the pump, and is discharged through passages 67, 66, 65, 64, through control valve 61, and thence through passage 62 into the reservoir 59 again, wherein it flows in the circuitous or devious path heretofore described to the vertically extending passage 68 to complete its circuit through the device. In this instance, due to the relatively small resistance to flow of the operating fluid discharged from the pump, output shaft 52 will ordinarily remain stationary so that maximum differential in speed is obtained between the rotor or armature and the output shaft. If control valve 61 now be partly closed so as to partially restrict the flow of fluid discharged by the pump through the discharge passages 67, 66, 65 and 63, the reaction to the pressure developed in the operating fluid by the pump, due to this resistance to flow, will produce a rotary movement of the impeller 57 and output shaft 52, which are keyed together. The extent of such rotary motion, or the angular velocity of the impeller 57 and the output shaft 52, will depend upon the setting of control valve 61, which controls the flow and consequently the pressure and reaction to the pressure developed by the pump in the operating fluid. In other words, the differential of angular velocities of the rotor and the output shaft will depend upon the setting of control valve 61, in the instance now being considered, the differential being greatest with valve 61 in the completely open poistion and being the least or almost zero with valve 61 in the completely closed position.

Under the operating conditions described, control valve 60, on the suction side of the pump, may also be employed to control the speed of the output shaft by regulating the rate of flow of the operating fluid from the reservoir into the fluid pump. The setting of valve 60 can be selected to further accomplish the desired results in combination with the control valve 61, as has been clearly demonstrated in actual tests of the invention. With control valve 61 partially closed, and the output shaft rotating at a certain speed, the flow of liquid to the pump can be restricted by partially closing valve 60 and thereby the speed of output shaft will be decreased. This is due to the fact that with a certain setting of valve 61, which means a certain opening or orifice therein, any reduction in the amount of liquid pumped, such as by restricting the flow into the pump with valve 60, will result in a reduction of the speed of the output shaft 52. This result has been demonstrated in actual tests of the invention. If valve 60 is closed completely, thereby preventing any fluid from entering the pump, there will, of course, be no rotation of the output shaft 52. This control of the rate of flow of fluid to the pump, in addition to controlling the flow and pressure of the fluid discharged by the pump, for complete speed control and most efficient operation is another one of the features of the invention.

It will be perceived that in principle, the invention will operate with air or other gas as the fluid, provided the pump will develop air pressure when valve 61 is closed; an air pump could be employed, but the torque developed would be somewhat limited because of the compressibility of the air. The torque developed at the output shaft is directly proportional to the pressure of the fluid in the discharge side of the pump.

The heat produced in the operating fluid under certain conditions of operation is dissipated in the flow of the fluid through the reservoir at the bottom of the unit. This heat is absorbed from the fluid by the housing and the several webs in the reservoir thereof and is dissipated by radiation, conduction and convection from the housing. This cooling effect may be facilitated by virtue of the housing being secured in spaced relationship to the member or device upon which it is supported thereby providing a space through which air circulates.

Due to the symmetry of arrangement of the several parts of the device about a centrally disposed transverse plane, it will be perceived that the device is readily reversible without the necessity for any adjustments. (Of course, it may be desirable to regulate one or both of the control valves for the best speed of operation and the required torque, as has been explained.) Upon reversal of the direction of rotation of the rotor, the fluid pump will be reversed and the circulation of operating fluid through the device will be reversed. Since the control valves control the flow of the operating fluid delivered to and discharged by the pump, the same adequate degree of control is provided for the device when operating in reverse direction as when operating in the direction previously described. With this control, regardless of the direction of operation, with a constant speed of rotation of the rotor, the output shaft may be operated at any desired speed of rotation from zero to the maximum speed of the rotor with no gaps whatever in the attainable speeds of rotation of the output shaft. In other words, an infinite variation in speeds of the output shaft is possible from zero to maximum.

The foregoing description of the operation of the device pertains primarily to its operation as a motor which provides infinite variations in the speed of the motor output shaft. However, as heretofore indicated, the motor also functions as a clutch between the armature (or rotor) and the output shaft. With control valves 60 and 61 wide open, the output shaft remains at rest when the armature or rotor is in motion. Assuming that the rotor as seen in Fig. 2, is rotated in a clockwise direction, as previously described, and both control valves are open, fluid will be discharged from the pump through passages 67, 66, 65, 64 and through control valve 61, thence through passage 62 into the reservoir 59, and the output shaft will remain stationary. As valve 61 is gradually closed, the flow of the fluid from the pump is restricted and a pressure is developed, the result being that the output shaft begins to rotate. The torque developed at the output shaft is directly proportional to the pressure developed by the pump, and is dependent upon the reaction to the load on the output shaft. As control valve 61 is gradually closed, the speed of the output shaft is increased until a speed equivalent to that of the rotor (or armature) is reached. This provides perfect clutch action because the increase in speed of the output shaft is accomplished in an almost infinite number of steps. Any difference in speed of the rotor and the output shaft, with valve 61 closed completely, will be due to the fact that the volumetric efficiency of the pump is not 100%, and may also be due to any leakage where rotor hub 28 fits into bearing member 36.

The transmission of power from the rotor to the output shaft is accomplished entirely by hydraulic means since there is no mechanical linkage between the two. Consequently, the device also functions as a hydraulic coupling with its numerous advantages over a mechanical coupling. One of the important advantages is the dampening and elimination of any torsional vibrations which would otherwise be transmitted from the rotor to the output shaft. Moreover, this hydraulic coupling prevents the transmission of sudden shock loads from the output shaft to the rotor (or armature).

In Fig. 6 there is illustrated one embodiment of automatic pressure control mechanism applicable to the motor of the present invention, which will function to maintain a constant or substantially constant pressure in a tank, reservoir, pipe line, or the like. As shown, the pressure control device is applied to control valve 61 which in this instance would be disposed on the pressure side of the rotary pump mounted in the rotor, but it will be understood that a similar arrangement may be utilized in connection with the other control valve 60, so that a predetermined fixed pressure may be maintained irrespective of the direction of rotation of the motor. That part of the motor and control valve 61 which is shown in Fig. 6 is similar in all respects to the arrangement shown in Fig. 3 of the drawings. In this instance, however, the hand operating wheel of the control valve is replaced by an automatic device which will suitably position control valve 61 to cause the variable speed output shaft 52 to operate a fluid pump or other device 90 which will discharge fluid into the reservoir, tank or pipe line, or the like, 91, in such quantity and at such times as to maintain the pressure therein at the desired predetermined fixed value.

To the control valve housing 95 (Fig. 6) there is secured the automatic controlling device which is enclosed in a housing 96. A control shaft 97 passes through the lower plate 98 of housing 96, then through a suitable packing gland 99 therein, and is connected at its outer end to the end of valve rod 100 of control valve 61. The inner end of control shaft 97 is provided with an annular flange 101, which slidably engages the inner cylindrical wall of the casing 96 in such manner as to function as a piston. The chamber 102 in the casing 96 between flange 101 and the bottom plate 98, provides a fluid reservoir which is connected by means of a pipe 103 to the tank or reservoir in which the desired pressure is to be maintained. A compression coil spring 103 is disposed in casing 96 between flange 101 and a movable disk 104, the position of which in the casing 96 may be altered by means of adjusting nut 105 which is threaded into the outer end of the housing 96. An anti-friction bearing 106 is interposed between the nut 105 and the disk 104. A rod 107 has one end secured to the center of flange 101 with the other end passing freely through a central aperture 108 in nut 105.

In operation, with chamber 102 connected through pipe 103 to the interior of the tank or the like, in which the predetermined pressure is to be maintained, or substantially maintained, and with nut 105 adjusted to provide the proper degree of pressure on flange 101 through spring 103, a decrease in the pressure in the tank 91 will mean a decrease in the pressure in the chamber 102, and will cause flange 101 to move to the right, as seen in Fig. 6, thereby moving control valve 61 toward closed position so as to restrict or cut off the flow of fluid from the discharge of the rotary pump supported by the rotor. The result of this change in fluid flow from the fluid pump, as has been previously described, will increase the operating speed of the output shaft 52, and thus the pump or other device 90 which is operated by output shaft 52 will have its operating speed increased to an extent which will be sufficient to increase the pressure in the tank 91 to the desired predetermined value. When this point has been reached, any further increase in pressure in chamber 102 will move flange 101 to the left, as seen in Fig. 6, thereby opening control valve 61 and reducing the operating speed of output shaft 52, and the operating speed of the pump connected to this output shaft. In like manner, where the pressure in the tank is increased to a point beyond the predetermined fixed value, such pressure increase will be transmitted to chamber 102 which will cause valve 61 to be opened to an extent such that the rotation of shaft 52 will be stopped or will be reduced the required amount. In this manner it will be perceived that with the automatic pressure control mechanism of my invention, the operation of the motor herein disclosed serves to automatically maintain, or substantially maintain, a predetermined fixed pressure in a tank, reservoir, pipe line, or the like.

In Fig. 7, automatic speed control mechanism is illustrated as applied to the motor of my invention. This mechanism is constructed and arranged to maintain the speed of output shaft 52 constant, or substantially constant, at some desired speed, irrespective of variations in the load imposed upon the output shaft. The portion of the motor shown in horizontal section is similar to the right hand portion of Fig. 1 of the drawings. The speed control mechanism includes a governor operated from the output shaft 52, which controls a pilot valve, which in turn controls the operation of a servo-motor that actuates a control valve in the motor, preferably the valve which controls the discharge of fluid from the rotary pump in the rotor of the motor. More specifically, a bevelled gear 110 fixed to motor output shaft 52 meshes with and drives a bevelled gear 111 fixed to the shaft of a ball governor 112, which in turn controls a pilot valve 113 by axial reciprocatory movement thereof in pilot valve cylinder 114. High pressure fluid of any suitable character is conducted to the inlet 115 of cylinder 114 through conduit 116 from a suitable source, and after performing its function, the fluid is discharged into exhaust passage 117 of pilot valve cylinder 114, and is conducted through line 118 to the supply reservoir of this liquid. A most convenient source of high pressure fluid is the liquid under pressure in annular groove 64 in bearing member 36; if this is used the fluid discharged into exhaust passages 117 is conducted through line 118 to the reservoir 59 in base section 12 of the motor. The pilot valve 113 and its cylinder 114 is connected by separate passages 119 and 120 with opposite ends of a servo-motor consisting of a piston 121 operating in a cylinder 122. Rod 123 on piston 121 is connected to the stem 124 of the control valve 61.

In operation, an increase in the load imposed upon output shaft 52 will reduce the speed of this shaft and will move the balls or weights of governor 112 inwardly toward the longitudinal axis of the governor, and will result in moving pilot valve 113 downwardly in its cylinder 114 thereby connecting inlet 115 with passage 119 and permitting high pressure fluid to flow into the lower end of operating cylinder 122, as seen in Fig. 7. At the same time passage 120 will be connected with exhaust passage 117. Piston 121 of the servo-motor will be moved upwardly as seen in Fig. 7, and will move control valve 61 to or toward closed position, the extent of the movement being determined by the extent to which the speed of the output shaft 52 is decreased. The result of the closing movement of control valve 61 will be to increase the absolute speed of output shaft 52 as heretofore described, or, in other words, will reduce the speed differential between the rotor and the output shaft. The speed of the output shaft will be increased until it is revolving at the predetermined fixed speed. Should, however, the speed of the output shaft increase to a point beyond the predetermined fixed speed, ball governor 112 will move pilot valve 113 upwardly, as seen in Fig. 7, thereby connecting passage 119 with exhaust passage 117 and relieving some of the pressure in the lower end of cylinder 122, thereby opening control valve 61 and reducing the speed of the output shaft to the point desired. In this manner, it will be perceived that the speed of the output shaft of the motor of my invention may be automatically controlled so that it is maintained at a fixed or substantially fixed speed, irrespective of variations in load on the output shaft. The importance and advantage of this feature of my invention will be apparent to those skilled in the art.

In the form of the invention selected for illustration and description, the electric motor is of the squirrel cage induction type. It will be readily understood by those skilled in the art to which this invention relates that the rotor, instead of being equipped with a squirrel cage winding, could be fitted with a wound rotor winding and slip rings. The wound rotor slip rings could be fastened on the rotor between bearing supporting rings 19 and hub flange 30 by providing more axial space at this section. The brushes for the slip rings could be attached to a support fastened to bearing supporting ring 19, which remains stationary. In the same manner, the rotor could be equipped with a direct current armature winding and a commutator instead of squirrel cage rotor winding. The commutator could be fastened to the rotor at the section just designated for the slip rings of a wound rotor winding. Similar construction could readily be employed for alternating current motors of the repulsion induction type where a commutator is employed.

It will be perceived that the invention can also be employed as an alternating current generator to obtain a wide variety of frequencies of alternating current. When operated as a variable frequency alternating current generator, shaft 52 would be driven by a prime mover. The rotor and stator would be equipped with appropriate alternating current generator windings. By manipulating valves 60 and 61, as has previously been described, it is seen that the rotor speed could be varied over wide limits from zero to maximum speed of shaft 52. Since the frequency of the alternating current from a generator is directly proportional to the speed of the rotor, any frequency from zero to maximum speed can thus be obtained.

In the form heretofore disclosed, the invention is applied to electric motors, particularly of the squirrel cage induction type. However, the invention is not limited in its application to electric motors, as has been mentioned previously, but may be applied to other types of motors and prime movers. For example, the invention may readily be applied to steam turbines as illustrated in Fig. 8 of the drawings. Referring to this figure, the rotor and associated parts including bearings, fluid pumps, fluid passages, control valves, etc., are identical or similar to the same elements included in the form of the invention disclosed in Figs. 1 to 5. In this instance the rotor 26 is driven by a turbine wheel 130 keyed to the rotor by a key 131. The turbine wheel is enclosed in a suitable housing 132 having an annular steam chest 133 to which steam is supplied by steam line 134 controlled by a valve 135. Steam is conducted from the steam chest 133 to the turbine wheel through nozzle bodies 136 and nozzles 137, the size of the inlets to the nozzle bodies being controlled by valves 138. In accordance with usual practice, steam inlet control valve 135 is controlled by means of a suitable governor which will be operated from shaft 50 which is fixed to the rotor 26 and through the rotor to the turbine wheel 130. Such governor will operate lever 139 connected to valve arm 140. Suitable drains 141 are provided to conduct away any steam leakage through steam packing glands 142.

The operation of the arrangement illustrated in Fig. 8 is the same as the operation of the form of the invention shown in Figs. 1 to 5, excepting that the rotor 26 is driven by a steam turbine rather than by an electric motor. In other words, infinite speed variations of output shaft 52 are possible from zero to maximum rotor speed, for any speed of the turbine wheel 130.

Obviously, other types of prime movers, such as water turbines, air turbines, and other rotary fluid motors may be utilized for driving the rotor 26 with arrangements as compact as those illustrated in the drawings.

Since changes may be made in the form, location and relative disposition of the several parts of the arrangements herein disclosed without departing from the principles of the invention, it will be understood that no intention is entertained to limit the invention except by the scope of the appended claims.

What is claimed is:

1. A variable speed dynamo electric machine having an armature, a shaft for the armature freely rotatable with respect thereto, fluid actuating means operatively connected to the shaft, means for conducting fluid to and from the fluid actuating means, means for controlling the flow of fluid to the fluid actuating means, and means independent of said controlling means for controlling the fluid flow and pressure produced by said fluid actuating means, whereby the speed of the shaft may be varied with respect to the speed of the armature and the shaft may be hydraulically connected to and disconnected from the armature.

2. A variable speed dynamo electric machine having an armature, a shaft for the armature freely rotatable with respect thereto, a rotary pump supported by the armature, means for conducting fluid to and from the pump, means for controlling the flow of fluid to the pump, and means independent of said controlling means for controlling the fluid flow and pressure produced by the pump to thereby vary the speed of the shaft relative to the speed of the armature and whereby the shaft may be connected to and disconnected from the armature.

3. A variable speed motor having a rotating element, an output shaft, fluid actuated means disposed within said motor to provide variable speeds for the shaft, an enclosure for fluid, a device operated by said shaft for delivering fluid under pressure to the enclosure, and means responsive to the pressure in the enclosure for automatically controlling the operation of the shaft and said device to maintain a fixed or substantially fixed predetermined pressure in the enclosure.

4. A variable speed motor having a rotating element, an output shaft, fluid actuated means disposed within said motor to provide variable speeds for the shaft, and means for automatically maintaining the speed of the shaft substantially constant irrespective of variations in load on the shaft.

5. A variable speed dynamo electric machine having an armature, a shaft for the armature freely rotatable with respect thereto, fluid actuating means supported by the armature and operatively connected to the shaft, means for conducting fluid to and from the fluid actuating means, means for controlling the flow of fluid to the fluid actuating means, and separate means for controlling the fluid flow and pressure produced by the fluid actuating means, whereby the speed of the shaft may be varied with respect to the speed of the armature.

6. A variable speed dynamo electric machine having an armature, a shaft for the armature freely rotatable with respect thereto, fluid actuating means supported by the armature and operatively connected to the shaft, means for conducting fluid to and from the fluid actuating means, means for controlling the flow of fluid to the fluid actuating means, and independently operable means for controlling the fluid flow and pressure produced by the fluid actuating means, whereby the speed of the shaft may be varied with respect to the speed of the armature.

7. A variable speed dynamo electric machine having an armature, a shaft for the armature freely rotatable with respect thereto, a rotary pump supported by the armature and operatively connected to the shaft, means for conducting fluid to and from the rotary pump, means for controlling the flow of fluid to the rotary pump, and separate means for controlling the fluid flow and pressure produced by the rotary pump, whereby the speed of the shaft may be varied with respect to the speed of the armature.

8. A variable speed dynamo electric machine having an armature, a shaft for the armature freely rotatable with respect thereto, a rotary gear pump supported by the armature and operatively connected to the shaft, means for conducting fluid to and from the pump, means for controlling the flow of fluid to the pump, and separate means for controlling the fluid flow and pressure produced by the pump, whereby the speed of the shaft may be varied with respect to the speed of the armature.

9. A variable speed dynamo electric machine having an armature, a shaft for the armature freely rotatable with respect thereto, a rotary gear pump comprising a gear supported on the armature and a second gear fixed to the shaft and meshing with the first gear, means for conducting fluid to and from the pump, means for controlling the flow of fluid to the pump, and separate means for controlling the fluid flow and pressure produced by the pump, whereby the speed of the shaft may be varied with respect to the speed of the armature.

10. A variable speed dynamo electric machine having an armature, a shaft for the armature freely rotatable with respect thereto, a rotary gear pump comprising a gear supported on the armature and a second gear fixed to the shaft and meshing with the first gear, a passage through which fluid is conducted to the pump, another passage through which fluid is conducted from the pump, and a valve for controlling the flow of fluid through each passage, each valve being operable independently of the other, whereby the speed of the shaft may be varied with respect to the speed of the armature.

11. A variable speed motor having a rotating element, a shaft for the element freely rotatable with respect thereto, fluid actuating means supported by the element and operatively connected to the shaft, means for conducting fluid to and from the fluid actuating means, means for controlling the flow of fluid to the fluid actuating means, and separate means for controlling the fluid flow and pressure produced by the fluid actuating means, whereby the speed of the shaft may be varied with respect to the speed of the element.

12. A variable speed motor having a rotating element, means acting upon the outer peripheral portion of the element for rotating the element, a shaft for the element freely rotatable with respect thereto, fluid actuating means supported by the element and operatively connected to the shaft, means for conducting fluid to and from the fluid actuating means, means for controlling the flow of fluid to the fluid actuating means, and separate means for controlling the fluid flow and pressure produced by the fluid actuating means, whereby the speed of the shaft may be varied with respect to the speed of the element.

13. A variable speed motor having a rotating element, means acting upon the outer peripheral portion of the element for rotating the element, a shaft for the element freely rotatable with respect thereto, fluid actuating means supported by the element and operatively connected to the shaft, means for conducting fluid to and from the fluid actuating means, a fluid reservoir from which fluid is supplied to the fluid actuating means and into which fluid is discharged thereby, means for controlling the flow of fluid to the fluid actuating means, and separate means for controlling the fluid flow and pressure produced by the fluid actuating means, whereby the speed of the shaft may be varied with respect to the speed of the element.

14. A variable speed motor having a rotating element, means actuating upon the outer peripheral portion of the element for rotating the element, a shaft for the element freely rotatable with respect thereto, fluid actuating means supported by the element and operatively connected to the shaft, means for conducting fluid to and from the fluid actuating means, a fluid reservoir from which fluid is supplied to the fluid actuating means and into which fluid is discharged thereby, means in the reservoir to cause the fluid to flow therein in a circuitous path, means for controlling the flow of fluid to the fluid actuating means, and separate means for controlling the fluid flow and pressure produced by the fluid actuating means, whereby the speed of the shaft may be varied with respect to the speed of the element.

15. A variable speed dynamo electric machine having an armature, a shaft for the armature freely rotatable with respect thereto, fluid actuating means supported by the armature and operatively connected to the shaft to provide variable speeds for the shaft with respect to the speed of the armature, an enclosure for fluid, a device operated by said shaft for delivering fluid under pressure to the enclosure, and means responsive to the pressure in the enclosure for automatically controlling the operation of the shaft and said device to maintain a fixed or substantially fixed predetermined pressure in the enclosure.

16. A variable speed dynamo electric machine having an armature, a shaft for the armature freely rotatable with respect thereto, fluid actuating means supported by the armature and operatively connected to the shaft to provide variable speeds for the shaft with respect to the speed of the armature, an enclosure for fluid, a device operated by said shaft for delivering fluid under pressure to the enclosure, a passage for conducting fluid to the fluid actuating means, another passage for conducting fluid from said fluid actuating means, a valve for controlling each passage, and means responsive to the pressure in the enclosure for automatically controlling the operation of one of said valves to control the operation of the shaft and said device to maintain a fixed or a substantially fixed predetermined pressure in the enclosure.

17. A variable speed dynamo electric machine having an armature, a shaft for the armature freely rotatable with respect thereto, fluid actuating means supported by the armature and operatively connected to the shaft to provide variable speeds for the shaft with respect to the speed of the armature, and means for automatically maintaining the speed of the shaft substantially constant irrespective of variations in load on the shaft.

18. A variable speed dynamo electric machine having an armature, a shaft for the armature freely rotatable with respect thereto, fluid actuating means supported by the armature and operatively connected to the shaft to provide variable speeds for the shaft with respect to the speed of the armature, a passage for conducting fluid to the fluid actuating means, another passage for conducting fluid from said fluid actuating means, a valve for controlling each passage, and means actuated by said shaft for automatically controlling the operation of one of said valves to control the shaft to thereby maintain the speed of the shaft substantially constant irrespective of variations in load on the shaft.

19. A variable speed dynamo electric machine having an armature, a shaft for the armature freely rotatable with respect thereto, fluid actuating means supported by the armature and operatively connected to the shaft to provide variable speeds for the shaft with respect to the speed of the armature, a passage for conducting fluid to the fluid actuating means, another passage for conducting fluid from said fluid actuating means, a valve for controlling each passage, a governor operated by said shaft, a pilot valve operated by the governor, and fluid pressure responsive means controlled by said pilot valve for operating one of said valves to control the shaft to thereby maintain the speed of the shaft substantially constant irrespective of variations in load on the shaft.

HUGO L. RUSCH.